US009562548B2

(12) United States Patent
Breidenassel et al.

(10) Patent No.: US 9,562,548 B2

(45) Date of Patent: Feb. 7, 2017

(54) FASTENING ELEMENT, LUMINOUS MODULE AND LUMINOUS APPARATUS

(75) Inventors: Nicole Breidenassel, Bad Abbach (DE); Tobias Frost, Burlengenfeld (DE); Guenter Hoetzl, Regensburg (DE); Thomas Preuschl, Sinzing (DE); Peter Sachsenweger, Zeitlarn (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 13/810,195

(22) PCT Filed: Jul. 11, 2011

(86) PCT No.: PCT/EP2011/061729
§ 371 (c)(1), (2), (4) Date: Jan. 14, 2013

(87) PCT Pub. No.: WO2012/007413
PCT Pub. Date: Jan. 19, 2012

(65) Prior Publication Data
US 2013/0121759 A1 May 16, 2013

(30) Foreign Application Priority Data
Jul. 14, 2010 (DE) ........................ 10 2010 031 312

(51) Int. Cl.

| | |
|---|---|
| ***F21V 7/00*** | (2006.01) |
| ***F16B 1/00*** | (2006.01) |
| ***F21V 17/04*** | (2006.01) |
| ***F21V 19/00*** | (2006.01) |
| ***F21V 29/00*** | (2015.01) |
| ***F21V 21/14*** | (2006.01) |

(Continued)

(52) U.S. Cl.
CPC . *F16B 1/00* (2013.01); *F21V 7/00* (2013.01); *F21V 17/04* (2013.01); *F21V 19/004* (2013.01); *F21V 19/0035* (2013.01); *F21V 21/14* (2013.01); *F21V 29/004* (2013.01); *F21V 7/005* (2013.01); *F21V 7/06* (2013.01); *F21V 17/14* (2013.01); *F21V 17/164* (2013.01); *F21V 23/005* (2013.01); *F21Y 2101/00* (2013.01); *F21Y 2105/10* (2016.08); *F21Y 2115/10* (2016.08); *Y10T 403/608* (2015.01)

(58) Field of Classification Search
USPC ......... 403/321, 322.1, 322.4, 325, 329, 330; 362/249.01, 249.02, 249.04
See application file for complete search history.

(56) References Cited

U.S. PATENT DOCUMENTS 6,582,100 B1 * 6/2003 Hochstein et al. ........... 362/294
2009/0237942 A1 * 9/2009 Lam ........................ H01L 33/58 362/308

FOREIGN PATENT DOCUMENTS

| | | |
|---|---|---|
| DE | 10 2007 03878 | 2/2009 |
| WO | WO 2007/128070 | 11/2007 |
| WO | WO 2010/044011 | 4/2010 |

OTHER PUBLICATIONS

Machine Translation of DE 102007038787, generated Jun. 26, 2015 from http://worldwide.espacenet.com.*

(Continued)

*Primary Examiner* — Daniel Wiley
(74) *Attorney, Agent, or Firm* — Cozen O'Connor

(57) ABSTRACT

A fastening element for fastening a light source substrate to a support. The fastening element is configured to be seated on the light source substrate, and includes at least one fastening portion for fastening to the support.

19 Claims, 8 Drawing Sheets

(51) Int. Cl.

| | |
|---|---|
| *F21V 17/16* | (2006.01) |
| *F21V 7/06* | (2006.01) |
| *F21V 23/00* | (2015.01) |
| *F21V 17/14* | (2006.01) |
| *F21Y 101/00* | (2016.01) |

(56) References Cited

OTHER PUBLICATIONS

Office Action dated May 4, 2015 which issued in the corresponding Chinese Patent Application No. 201180034666.3.

* cited by examiner 62
61
53
106
8
65
64

102
103
3
6
7
6
103
7
2
65
65

67
67
65
66

FASTENING ELEMENT, LUMINOUS MODULE AND LUMINOUS APPARATUS

RELATED APPLICATIONS

This is a U.S. National Phase Application under 35 USC 371 of International Application PCT/EP2011/061729 filed on Jul. 11, 2011.

This application claims the priority of German application no. 10 2010 031312.2 filed Jul. 14, 2010, the entire content of which is hereby incorporated by reference.

FIELD OF THE INVENTION

The invention relates to a fastening element for fastening a light source substrate, in particular a luminous module, on a support. Furthermore, the invention relates to a luminous module having such a fastening element. The invention also relates to a luminous apparatus having a light source substrate or luminous module fastened on a support.

BACKGROUND OF THE INVENTION

FIG. 1 and FIG. 2 show a luminous module which has a light source substrate in the form of a printed circuit board 102 substantially shaped like a circular disk. The printed circuit board 102 is placed having its rear side 103 on a cooling body 104 used as the support and is equipped on its front side 105 with multiple light sources in the form of light-emitting diodes 106 and multiple electronic components 107. The luminous module 101 and the cooling body 104 can together form a luminous apparatus 101, 104 or can be part thereof.

The cooling body 104 has a substantially cylindrical basic shape. The light-emitting diodes 106 are arranged compactly in a central region 108 of the printed circuit board 102, and the electronic components 107 are located in a surrounding region 109 in the form of a circular ring, which concentrically encloses the central region 108.

A ring cover 110, which is open on the bottom side, covers or arches over, respectively, the surrounding region 109 of the printed circuit board 102. The ring cover 110 has an outer wall 111 having a substantially hollow-cylindrical shape and an inner wall 112 concentric thereto having a substantially hollow-cylindrical shape having smaller diameter. The outer wall 111 and the inner wall 112 are connected to one another by a horizontally level cover plate 113 or lid in the shape of a circular ring. In other words, the ring cover 110 has a cross-sectional shape which substantially corresponds to an inverted "U". The ring cover 110 is seated on the printed circuit board 102, and so it is externally flush with the printed circuit board 102. The inner wall 112 encloses the light-emitting diodes 106 and is formed on its side facing toward the light-emitting diodes 106 as a mirrored or diffuse reflector, to form a light channel for the light-emitting diodes 106.

The ring cover 110 has a screw mount 114 to receive a screw 115 seated thereon, the screw 115 leading through a feedthrough opening 116 in the printed circuit board 102 into a screw hole 117 in the cooling body 104 and being screwed therein. By tightening the screw 115, the ring cover 110 is drawn toward the cooling body 104 and thus presses in the printed circuit board 102 to fix it between the ring cover 110 and the cooling body 104.

On an opposite side of the ring cover 110 with respect to an axis of symmetry S, this ring cover is held on the cooling body by means of an elastic bent sheet-metal strip 118 made of metal. The sheet-metal strip 118 is fastened by means of a screw 119 on the cooling body 104 and rests at its other end region on the cover plate 113 of the ring cover 110. The sheet-metal strip 118 is under tension, so that it presses the ring cover onto the printed circuit board 102 under all thermal load states, to suppress incorrect adaptations because of production tolerances, waste heat, and aging processes, etc.

The outer wall 111 protrudes forward beyond the cover plate 113, and does so over the entire circumference. The ring cover 110 thus has an upwardly directed projection 120 (which is formed by the region of the outer wall 111 protruding forward beyond the cover plate 113) even in a region in which the sheet-metal strip 118 arches over it. The sheet-metal strip 118 can thus be prevented from slipping off the ring cover 110 or vice versa.

Instead of the use of the sheet-metal strip 118, the ring cover can alternatively also be fastened by means of two or more screw mounts 114 and screws 115 received therein.

SUMMARY OF THE INVENTION

One object of the present invention is to provide a particularly easily installable and thermally effective attachment of at least one luminous module, in particular an LED module, to an associated support.

The object is achieved in accordance with one aspect of the invention by a fastening element for fastening a light source substrate, in particular without tools, to a support (in particular a luminous module), the fastening element being configured or designed for the purpose of being seated (at least partially) on the light source substrate, and the fastening element having at least one fastening means for fastening the fastening element to a support of the light source substrate (the light source substrate lies directly or indirectly on the support). In other words, the fastening element can have at least one support element to be seated on a side of the light source substrate which is equipped with at least one semiconductor light source. The at least one support element can have at least one contact surface for (directly or indirectly) contacting the equipped side of the light source substrate for this purpose.

The fastening element therefore presses the light source substrate onto the support and also allows, e.g., thermally efficient contact between the light source substrate and the support. Dedicated or separate fastening means such as screws, etc. can be omitted through the fastening element, which decreases piece costs and simplifies installation. In particular, the use of small screws (M3 to M4) can be omitted, which allows simple handling (since a screwdriver (manual screwdriver, pneumatic screwdriver, or electric screwdriver) is no longer needed). Rather, installation is made possible without tools, by hand or using simple contact pressure tools if needed.

The light source substrate can particularly be a substrate which is equipped with at least one light source. In addition, the light source substrate can be equipped with at least one electronic component. The light source substrate can be, for example, a printed circuit board or a so-called (e.g., ceramic) submount. The printed circuit board is preferably a metal core printed circuit board (MCPCB) to achieve a good heat dissipation of the waste heat from the light sources. Alternatively, the printed circuit board substrate can also have, e.g., FR4, etc. as a base material. The printed circuit board substrate can also be, e.g., a hybrid, e.g., having FR4 with a pressed-in metal core, e.g., a copper core or a countersunk (embedded) copper core.

The light source substrate can particularly be equipped on one side. The light source substrate can be implemented as single layer or multilayer. The light source substrate can be rigid or flexible (flex plate or flex circuit board, etc.).

The light source substrate can also have one or more regions, which are left out of component equipping and printed conductor guiding and in which the fastening element can contact and introduce the contact pressure force. The clearance preferably maintains predefined air and creepage distances as a function of an operating voltage. In metal core printed circuit boards, the dielectric material is preferably left clear therein, so that the fastening element can be pressed directly onto the metal base, which opens up further heat transfer and improves contact pressure, inter alia. Through the clearance of the dielectric material, damage to the dielectric material can also be avoided. Creepage effects (tension relaxation) of the dielectric material may also be avoided.

The clearances for contacting the fastening element are preferably arranged close to components which require heat dissipation (light sources, electronic components, etc.), to achieve good contact pressure on the support, in particular the cooling body, thereon. In particular in rigid light source substrates, the clearances can also be arranged on an outer edge.

The at least one light source preferably comprises at least one light-emitting diode or another semiconductor light source. If multiple light-emitting diodes are provided, they can emit light in the same color or in different colors. A color can be monochrome (e.g., red, green, blue, etc.) or multichrome (for example, white, e.g., cold white, warm white, or mint white, or also non-white, e.g., having a fluorescent-material-converted color mixture). The light emitted by the at least one light-emitting diode can also be an infrared light (IR LED) or an ultraviolet light (UV LED). Multiple light-emitting diodes can generate a mixed light; e.g., a white mixed light. The at least one light-emitting diode can contain at least one wavelength-converting fluorescent substance (conversion LED). The at least one light-emitting diode can be provided in the form of at least one individually housed light-emitting diode or in the form of at least one LED chip. Multiple LED chips can be installed on a common substrate ("submount"). The at least one light-emitting diode can be equipped with at least one separate and/or shared optic for beam guiding, e.g., at least one Fresnel lens, collimator, etc. Instead of or in addition to inorganic LEDs, e.g., based on InGaN or AlInGaP, organic LEDs (OLEDs, e.g., polymer OLEDs) are generally also usable. Alternatively, the at least one light source can, e.g., also have at least one diode laser or still another semiconductor light source in addition to an LED. However, the type of the light sources is not restricted to semiconductor light sources.

The support can particularly be a cooling body (heat convection element, heat dissipation element, etc.). The cooling body can be a dedicated cooling body or, e.g., another part of a lamp or a part of a light.

The at least one fastening element can be at least one elastically stretchable clamp in the simplest case.

The fastening element can particularly generate a force perpendicular to the light source substrate through a tension upon installation. The fastening element is preferably elastically stretched, in particular permanently elastically stretched. This elastic stretching is entirely or partially used to generate the contact pressure force. The use of a thus tensioned or elastically stretched fastening element can particularly compensate for geometry tolerances and/or decrease or even prevent a loss of the contact pressure force in the event of thermal expansions (especially multiple temperature cycles).

The fastening element preferably consists of metallic materials such as steel, especially spring steel, copper, and/or brass. The material thickness (wall thickness) can particularly be between approximately 0.2 mm and 2 mm, depending on the dimensions and design of the fastening element and the contact pressure force to be applied. In particular in the event of sufficient temperature and/or creepage resistance, plastic materials can also be used, which can be advantageous in particular for maintaining predefined air and creepage distances within limited geometry dimensions. The fastening element can also consist of a metal, which is at least regionally extrusion-coated using a plastic or sheathed using a rubber coating.

In one embodiment, the fastening element is embodied as a cover for at least partially covering a light source substrate. Parts can thus be saved and particularly simple installation can be achieved. Such a fastening element or cover can cover the at least one light source and/or at least one electronic component. The covering fastening element can cover or arch over the light source substrate partially (e.g., in the form of a ring cover) or over the entire area.

In another embodiment, the fastening element has at least one fastening means in the form of at least one catch element for latching with the support. The fastening element can thus be fastened particularly simply and nonetheless securely on the support. The catch element can particularly have a catch lug or a catch hook, the support particularly having at least one matching catch counter element, e.g., a catch recess.

In another embodiment, the at least one catch element has an elastically flexible tab equipped with at least one catch projection. The fastening element can thus be placed or plugged on the support without great application of force.

In still a further embodiment, the fastening element has multiple tabs, which extend to the rear of the fastening element and are arranged substantially symmetrically. A position of the fastening element and the associated luminous module in relation to the support, which is particularly well defined laterally, can thus be maintained. The use of multiple tabs also allows a uniform distribution of the contact pressure force. In the case of an at least substantially rotationally-symmetric embodiment of the fastening element, the tabs can also be arranged rotationally-symmetrically (optionally in a different number). Alternatively, the tabs can also be arranged mirror-symmetrically (optionally having rows offset to one another), for example, in the event of an oblong embodiment of the fastening element.

In an alternative embodiment, the fastening element has at least one pivotable lever having an external outer arm, the outer arm being laterally extendable or spreadable. The fastening element can thus contact the support with the at least one outer arm and press solidly thereon, and can do so through a targeted setting of a pivot location of the lever.

In another embodiment, a pivot location of the at least one lever is settable by means of at least one associated setting element, in particular a screw. A pivot location of the lever may thus be set particularly simply and precisely.

In another embodiment, the fastening element has at least two pivotable levers in a (particularly rotationally or mirror) symmetrical arrangement. A position of the fastening element and an associated luminous module can thus be set in a laterally variable manner, e.g., by different pivoting or extension of the lever. This is advantageous in particular if three or four levers are provided. Particularly secure fastening thus also results.

The lever is also preferably made elastic, to be able to compensate for slight loosening or turning back of the screw.

In an embodiment advantageous for a compact construction, at least one optical element is fastened on the fastening element. In addition, relative positioning of the optical element to the fastening element and therefore to the at least one light source having a particularly small tolerance can thus be achieved.

In an embodiment which is advantageous for particularly simple fastening of the luminous module, the fastening element is fixedly connected to the light source substrate. The substrate and the fastening element thus do not need to be positioned separately, but rather the luminous module can be positioned and fastened as a whole in one sequence.

The object is also achieved by a luminous module, having at least one light source substrate having a light source arranged on a front side of the light source substrate, the light source substrate being equipped with a fastening element as described above, wherein the fastening element is seated on the front side of the light source substrate. Screw holes no longer need to be provided in the printed circuit board, which improves a surface usage.

Another aspect of the invention is directed to a luminous apparatus, having a luminous module, in particular as described above, wherein the rear side of the light source substrate also rests on the support, in particular flatly, and the fastening element is both seated on the front side of the light source substrate and also fastened on the support, in particular fastened by latching.

Screw holes also no longer need to be provided in the support. With cast cooling bodies, a simpler tool and less wear thus result. With extruded cooling bodies, it is no longer necessary to drill, tap threads, or deburr.

The fastening element therefore particularly presses the light source substrate onto the support and thus ensures a particularly secure seat. The fastening element can particularly be under a continuous tension for this purpose, so that the contact pressure action is also continuously provided. For this purpose, the fastening element can be at least regionally elastically stretchable in a force path between the contact region on the light source substrate and the fastening region on the support.

The luminous apparatus can be a lamp or a light, for example.

One embodiment has a fastening element which has multiple tabs, which extend to the rear of the fastening element and are arranged substantially symmetrically, and the support has at least one counter-catch element for engaging with at least one catch element of the fastening element, e.g., at least one setback.

In a refinement which is advantageous for simple installation and simple embodiment of the support, the tabs at least partially laterally encompass the support. Correct lateral alignment is thus assisted in a simple manner.

One embodiment has a fastening element which has at least one pivotable lever having an external outer arm, the outer arm being laterally extendable, the support having a recess into which at least the light source substrate is inserted, the at least one outer arm being extended sufficiently far that it contacts the support, in particular a side wall of the recess, in a pressing manner.

In a refinement, the recess has at least one undercut in which at least one outer arm engages. This can securely prevent the luminous module from detaching from the support. In addition, a higher, in particular precisely metered contact pressure of the light source substrate on the support can thus be set.

In general, to improve a thermal transfer between the light source substrate and the support, it can be advantageous for at least one layer made of a material having good thermal conductivity, in particular thermal interface material, such as heat conduction paste, adhesive, film, etc., to be incorporated therebetween.

Another aspect of the invention is directed to a luminous apparatus, having a cover (in particular exclusively) for covering at least a part of the light source substrate, wherein the light source substrate rests on a support and the cover is seated on the light source substrate, as shown, e.g., in FIG. 1 and FIG. 2, and is clamped to the support by means of at least one independent fastening means. The cover can thus be implemented more simply. The cover can particularly be rigid or mechanically stiff, in order to be able to conduct the force introduced via the fastening element onto the light source substrate and distribute this force uniformly.

An independent fastening means can particularly be a fastening means which is not connected to the cover before an installation.

For example, the cover can be fastened on the support (in particular exclusively, i.e., for example, without additional screws) by means of springy or elastically stretchable clamp elements as the independent fastening means. The cover can particularly be a rigid cover.

BRIEF DESCRIPTION OF THE DRAWINGS

In the following figures, the invention is schematically described in greater detail on the basis of exemplary embodiments. Identical or identically acting elements can be provided with identical reference numerals for comprehensibility.

DETAILED DESCRIPTION OF THE DRAWINGS

Figure 3:
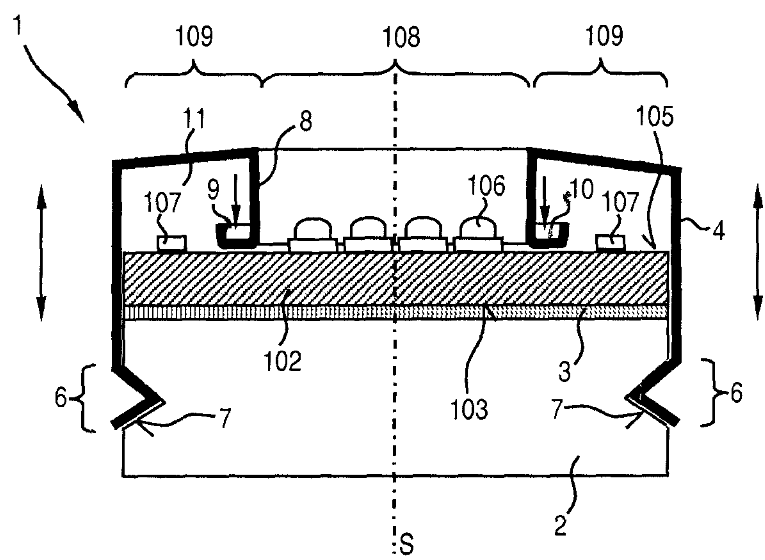
FIG. 3 shows a sectional illustration in a side view of an LED module according to a first embodiment, which is fastened on a cooling body.

FIG. 3 shows a sectional illustration in a side view of a luminous module, similar to the LED module 101, in the form of an LED module 1, which is fastened on a cooling body 2 used as a support. The LED module 1 and the cooling body 2 form at least part of a luminous apparatus 1, 2, e.g., a lamp or a light.

The cooling body 2 also has a substantially cylindrical basic shape, but now at least approximately corresponds in its diameter to the diameter of the printed circuit board 102. The printed circuit board 102 (in general: the light source substrate) is attached using its rear side 103 via a thermal interface material (TIM) 3, such as a heat conduction paste, a heat conduction film, or a heat conduction adhesive, to the cooling body 2.

The outer wall 5 of the ring cover 4 is drawn down past the printed circuit board 102 up to the cooling body 2 and engages laterally therein. A contact section 6 of the ring cover 4, which contacts the cooling body 2, is formed for this purpose as a V-shaped catch projection, which is oriented in profile in the direction of the cooling body 2 (inward), and which can latch in a matching setback 7 of the cooling body 2. The contact section 6 is thus used as a catch element, which can latch in a catch counter element of the cooling body 2, the setback 7.

The inner wall 8 of the ring cover 4 is bent over so it is U-shaped in profile on its edge 9 placed on the printed circuit board 102. The inner wall 8 is used as a support element or support section for the ring cover 4. Through the U-shape, in particular having a long transverse or connecting leg 10, a broad contact surface may be achieved, which decreases a contact pressure and avoids damage to the printed circuit board 102. A broad heat transfer surface can thus also be achieved.

When the ring cover 4 is latched on the cooling body 2, it is slightly elastically stretched and is thus under a tensile stress (as indicated by the double arrows) between the contact section 6 and the edge 9. The ring cover thus presses the printed circuit board 102 continuously onto the cooling body 2 and allows a secure seat of the printed circuit board 102 on the cooling body 2. The ring cover 4 is therefore also formed as a fastening element for the printed circuit board 102.

A fixed connection is also achieved, which prevents wobbling of the ring cover 4. Through the pressure on the corresponding contact regions (between the contact section 6 and the cooling body 2 as well as the edge 9 and the substrate 2, as indicated by the single arrows), good leak tightness, in particular light tightness, dust tightness, and/or moisture or water tightness of the intermediate space 11 over which the cover, e.g., the ring cover 4 here, arches is made possible. For this purpose, at least one seal element can be provided between the cover and the printed circuit board and/or the support, e.g., a sealing ring.

Instead of being fastened by screw connections, the ring cover 4 is thus designed as a self-retaining fastening element. A self-retaining element is distinguished in that it is fastenable without further fastening means (e.g., without screws 115, 119) to the cooling body 2 (or another suitable object). The self-retaining element can rather itself be equipped (in particular integrally) with at least one fastening means for fastening on the cooling body or can have or be such a fastening means. By means of the ring cover 4, additional (external) fastening elements can therefore be omitted and installation can be simplified, e.g., by simply plugging on the ring cover 4 until it latches in the cooling body 2.

The inner wall 8 is designed to stand vertically here, but can also be inclined, for example.

The ring cover 4 preferably consists of a material which only deforms elastically during the installation, e.g., a metallic plate or plastic. A metallic material is preferable, so that a thermal transition also occurs on the contact surface between the transverse leg 10 of the edge 9 and the substrate 2, and the ring cover can also be used as a cooling body or heat dissipation element.

In an alternative design, the ring cover 4 can already be fixedly attached, e.g., preinstalled, on the substrate 2 before an installation of the LED module 1, for example, by a fixed connection between the edge 9 and the printed circuit board 102. This allows still simpler installation of the LED module 1 on the cooling body 2.

Figure 4:
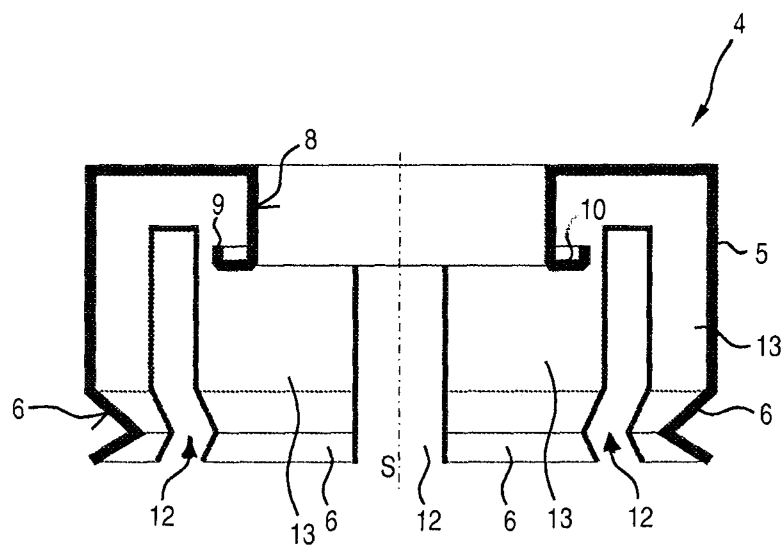
FIG. 4 shows a sectional illustration in a side view of a fastening element of the LED module according to the first embodiment.

FIG. 4 shows the self-retaining ring cover 4 as a sectional illustration in a side view. To allow a lateral movement of the outer wall 5 at least in the region of the contact section 6, relief slots 12 are introduced into the outer wall 5 distributed symmetrically around the longitudinal axis or axis of symmetry S, e.g., eight relief slots 12. Elastically springy tabs 13, which have the contact sections 6, are thus formed in the outer wall 5 in the region of the relief slots 12.

Figure 5:
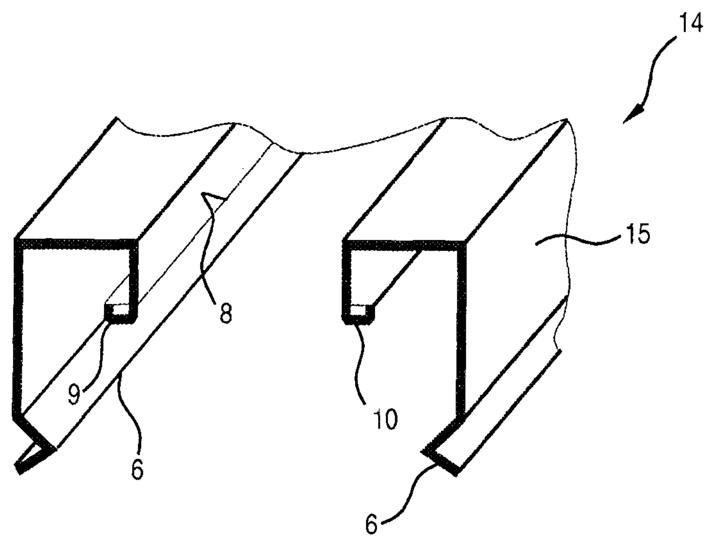
FIG. 5 shows a sectional illustration in a side view of a detail of a fastening element according to another embodiment.

FIG. 5 shows a detail of a further fastening element in the form of a self-retaining cover (or housing) 14 as a sectional illustration in a side view. The self-retaining cover 14 has a profile identical or similar to the profile of the self-retaining ring cover 4, but is now designed not as rotationally-symmetric, but rather extending longitudinally. The cover 14 can thus particularly also cover a longitudinally extending printed circuit board. The outer wall 15, which is also used as a tab, can also have relief slots or can omit them.

Figure 6:
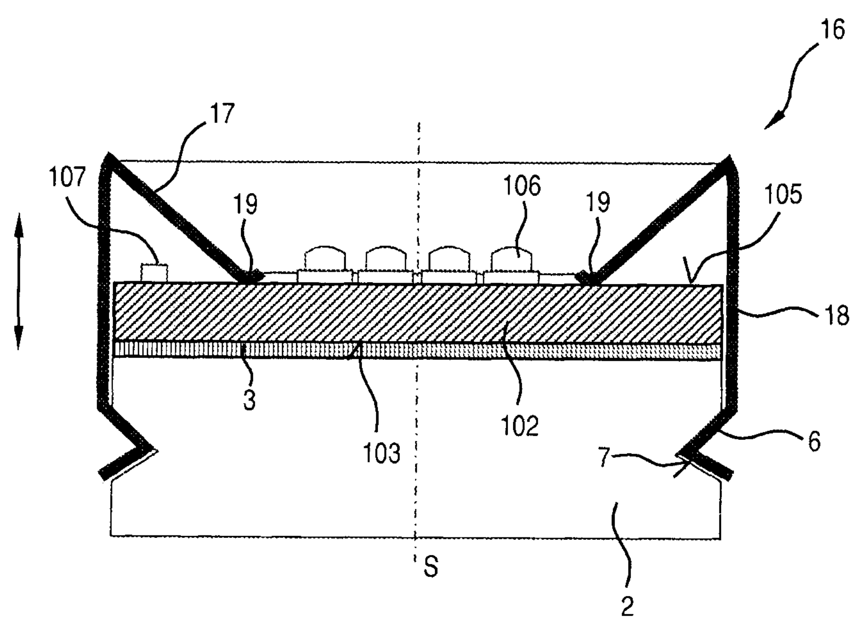
FIG. 6 shows a sectional illustration in a side view of an LED module according to still another embodiment.

FIG. 6 shows an LED module 16 having a similar structure as the LED module 1, except that the inner wall 17 of the ring cover 18 now runs diagonally in profile and can thus form a reflector which opens originating from the LEDs 106. Alternatively, the inner wall 17 can also be designed as curved in profile, e.g., parabolic.

Furthermore, the edge 19 of the inner wall 17 which is placed on the printed circuit board 102 is designed in a curved "V" shape in profile.

Figure 7A:
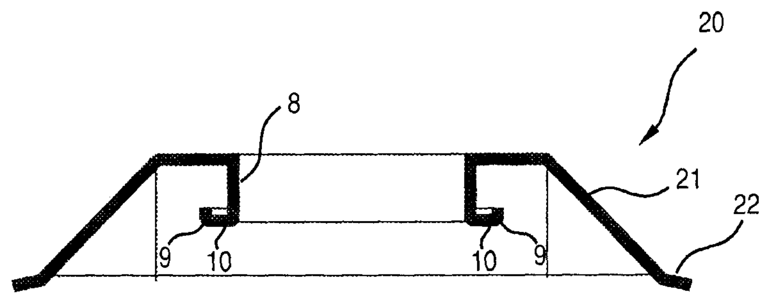
FIG. 7*a* shows a profile of a fastening element according to another embodiment in a first, relaxed state.

FIG. 7*a* shows a profile of a fastening element in the form of a self-retaining ring cover 20 according to still another design. Its outer wall 21 is now not designed as substantially perpendicular as in the ring covers 4 or 14, but rather is inclined and widens out downward (in the direction of its rear side or its contact section 22). The contact section 22, which terminates at the lower free edge, is inclined outward still more strongly in relation to the remaining outer wall 21, in particular bent or chamfered.

Figure 7B:
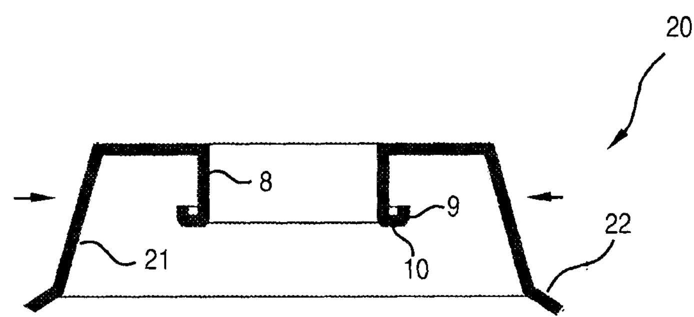
FIG. 7*b* shows the fastening element from FIG. 7*a* in a second, laterally pre-tensioned state.

FIG. 7*b* shows the ring cover 20 compressed on the outer wall in the lateral direction, as it is for installation by application of force on at least two sides, as indicated by the arrows.

Figure 7C:
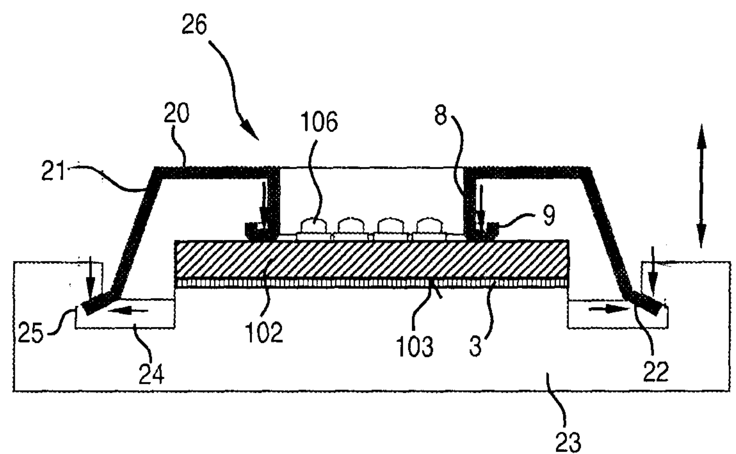
FIG. 7*c* shows the fastening element from FIG. 7*a* and FIG. 7*b* inserted in a cooling body in a third, partially tensioned state.

FIG. 7*c* shows the ring cover 20 as it has been inserted in a cooling body 23 and laterally relieved for this purpose. Through the lateral relief, the elastically deformable ring cover 20 has sprung back laterally and has partially relaxed. The cooling body 23 has one (e.g., peripheral) or multiple installation recesses 24 introduced into its side carrying the LED module 20 for this purpose. The installation recesses 24 each have an undercut 25 beginning on an outer side.

To fasten the ring cover 20 on the cooling body 23, the ring cover 20, which is laterally indented as shown in FIG. 7*b*, is inserted with its contact section 22 into the installation recess or recesses 24. With the lateral relief, the contact section 22 is pressed into the associated undercut 25. Housing the contact section 22 in the undercut 25 has the effect that the ring cover 20 does not disengage from the installation recess 24. In addition, the permanent stretching of the ring cover 20 in the perpendicular direction, which is indicated by the double arrows, is made possible, which prevents wobbling in the direction of the axis of symmetry S. Lateral slipping is prevented in that the ring cover 20 is still partially laterally under tension.

As a whole, the ring cover 20 is also self-retaining and does not require further fastening elements for its fastening and for fastening the associated LED module 26 on the cooling body 23. The LED module 26 and the cooling body 23 can form a part of a luminous apparatus.

Figure 8A:
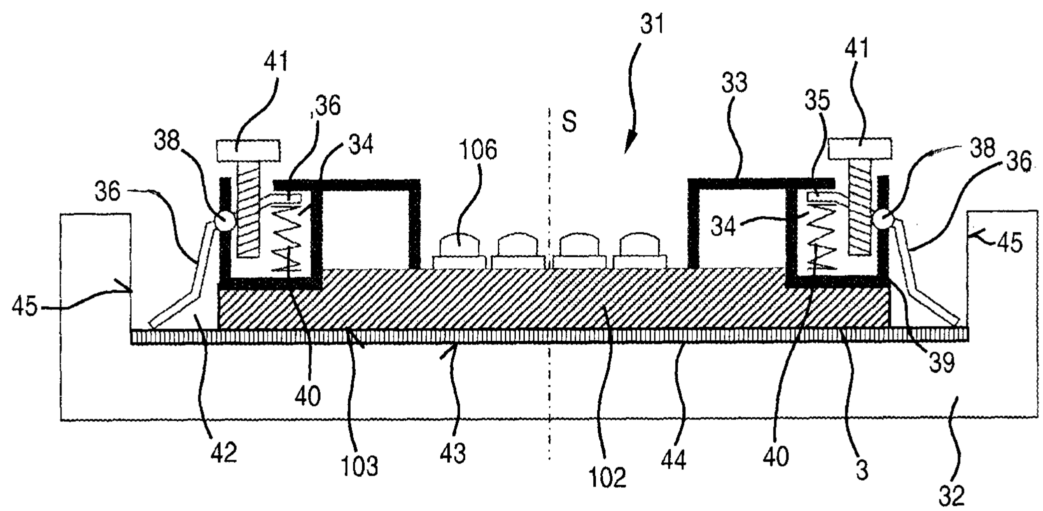
FIG. 8*a* shows a sectional illustration in a side view of an LED module according to still another embodiment, which is inserted in a cooling body, but not yet fastened thereon.

FIG. 8*a* shows a sectional illustration in a side view of an LED module 31 according to still a further embodiment, which is inserted into a cooling body 32, but is not yet fastened thereon.

The LED module 31 now has a rigid ring cover 33, which has a receptacle space 34 on at least two points. An inner arm 35 of a lever 36 is housed in the receptacle space 34, while an outer arm 37 of the lever 36 is arranged laterally outside the receptacle space 34. A pivot point 38 of the lever 36 is located in or on an outer wall 39 of the receptacle space 34. When the inner arm 35 is pressed down into the receptacle space 34, the outer arm 37 pivots upward and outward. The lever 36 is made at least slightly elastically flexible or springy.

A spring element 40, e.g., a coiled spring, is also located in the respective receptacle space 34, which spring presses the inner arm 35 upward so that the outer arm 37 presses more strongly against the LED module 31. In addition, a screw 41, which is accessible externally (from above), is also at least partially located in the respective receptacle space 34.

The LED module 31 is inserted into a recess 42 of the cooling body 32 and can contact a base 43 of the recess 42 via a layer 44 made of a thermal interface material, in particular on its rear side. The side wall 45 of the recess 42 is implemented vertically without an undercut here.

Figure 8B:
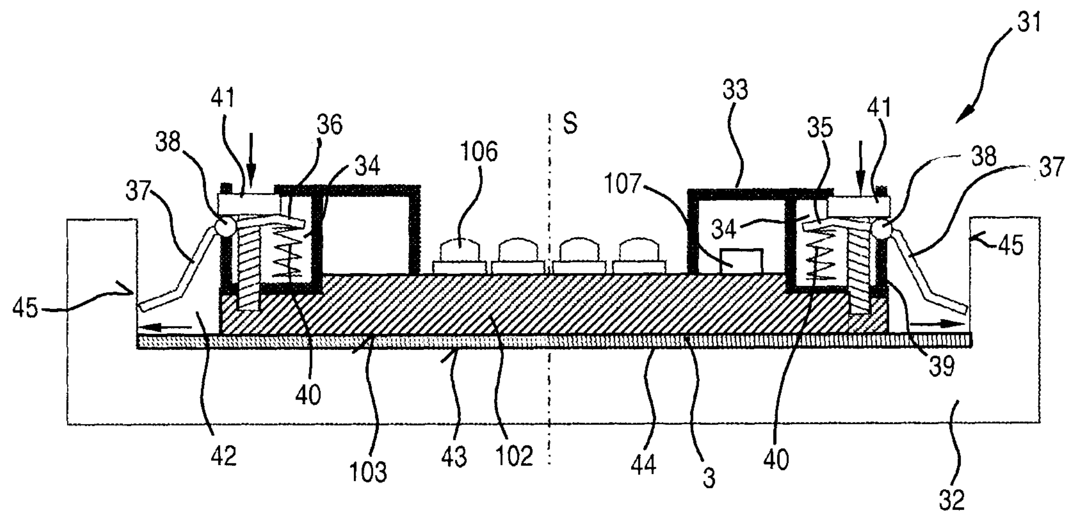
FIG. 8*b* shows a sectional illustration in a side view of the LED module from FIG. 8*a* as it is now fastened on the cooling body.

FIG. 8*b* shows a sectional illustration in a side view of the LED module 31, as it is fastened in the cooling body 32. In this state, the screw 41 is screwed into the receptacle space 34 (as indicated by the vertical arrows) and thus presses the inner arm 35 downward, e.g., in that its screw head carries along the inner arm 35. The outer arm 37 thus travels laterally outward (as indicated by the horizontal arrows) and contacts the side wall 45 of the recess 42. The LED module 31 can thus be fixedly clamped in the recess 42. Because the lever 36 is elastically deformable, the clamp fastening is comparatively tolerant in relation to slight turning back of the screw 41. Through the simultaneous movement of the outer arm 37 upward, the ring cover 33 and therefore the entire LED module 31 can also be pressed against the base 43 of the recess 42.

In the LED module 31, the fastening element therefore comprises at least the lever 36 and the screw 41. The LED module 31 and the cooling body 32 form a part of a luminous apparatus here.

Figure 9A:
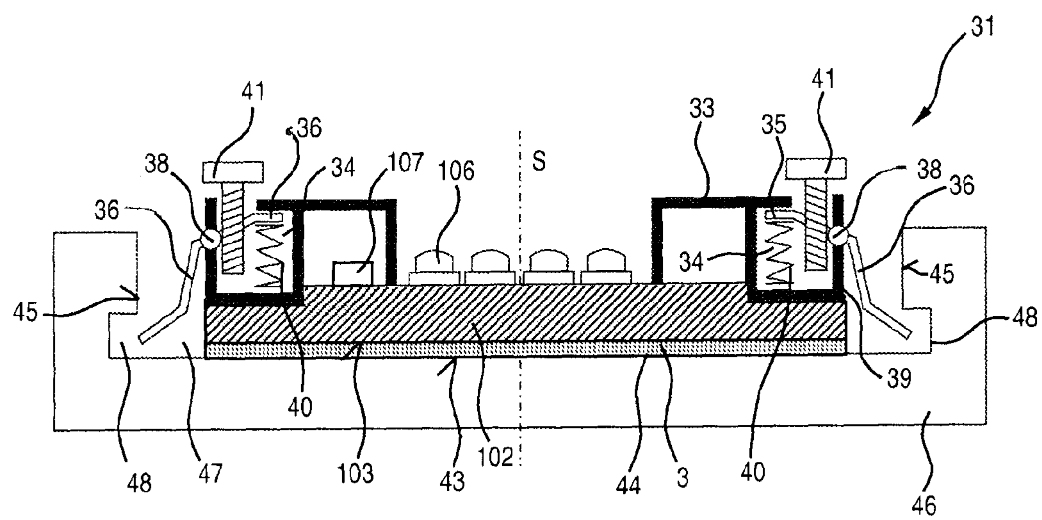
FIG. 9*a* shows a sectional illustration in a side view of the LED module from FIG. 8*b*, which is inserted in another cooling body, but not yet fastened thereon.
Figure 9B:
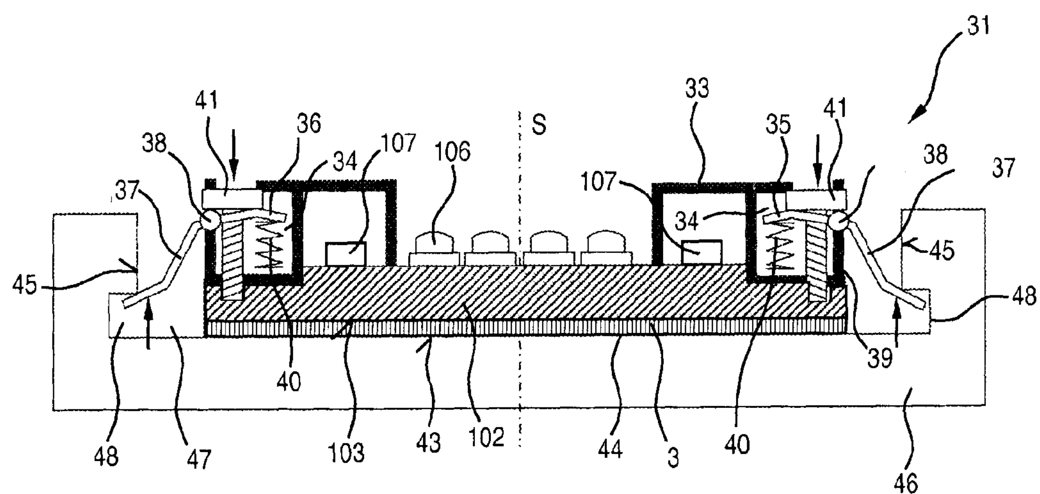
FIG. 9*b* shows a sectional illustration in a side view of the LED module from FIG. 9*a*, as it is now fastened on the other cooling body.

FIG. 9*a* shows a sectional illustration in a side view of the LED module 31, which is now inserted into a cooling body 46, but not fastened therein. The recess 47 has an undercut 48 arranged laterally on the outside. FIG. 9*b* shows a sectional illustration in a side view of the LED module 31, as it is fastened in the cooling body 46, and therefore at least a part of a luminous apparatus 31, 46.

The LED module 31 is now not fastened or not fastened exclusively in a friction-locked manner on the cooling body 46, but rather also in a formfitting manner by the engagement of the outer arm 37 in the associated undercut 48. Still more secure fastening can thus be achieved. In addition, a contact pressure of the LED module 31 on the cooling body 46 can be varied by setting the distance the screw 41 is screwed in, since with stronger pivoting of the lever 36, the outer arm 37 also presses more strongly against a top side of the undercut 48. The contact pressure force is not limited by a friction force of the outer arm 37 on the recess 47. The lever is preferably made stiffer or less flexible without an undercut 48 than upon the presence of the undercut 48.

Figure 10A:
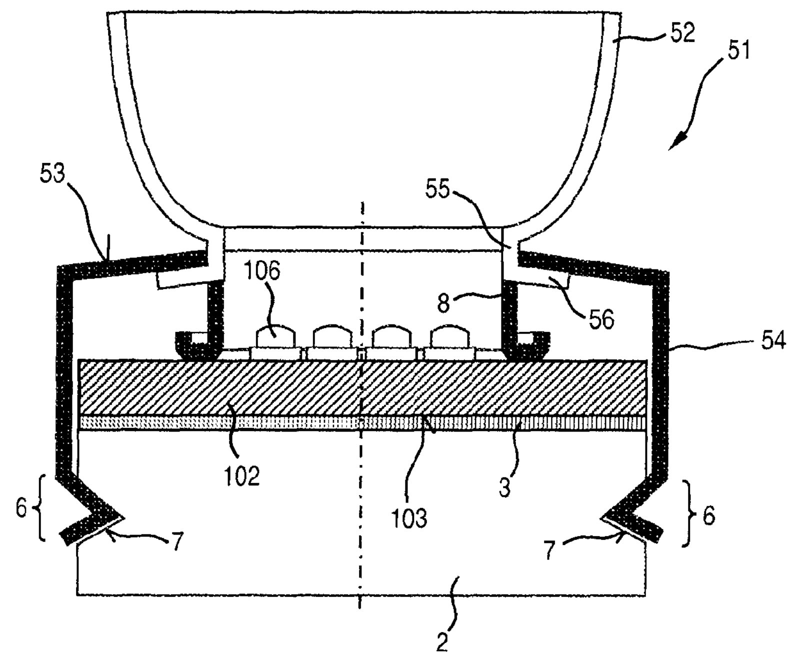
FIG. 10*a* shows a sectional illustration in a side view of an LED module according to still another embodiment.
Figure 10B:
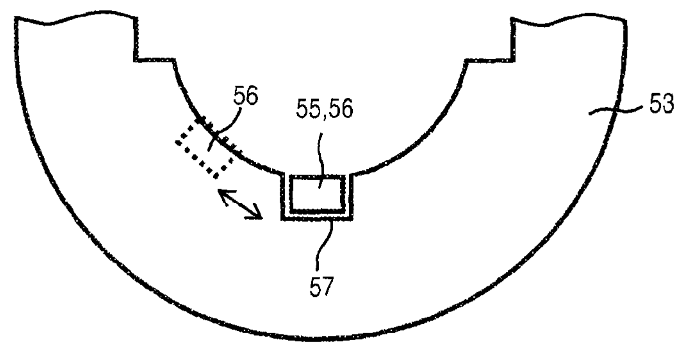
FIG. 10*b* shows a detail of the LED module from FIG. 10*a* in a top view.

FIG. 10*a* shows a sectional illustration in a side view of an LED module 51 according to still a further embodiment. The LED module 51 is constructed similarly to the LED module 1 and is fastenable on a cooling body 2, but now has the possibility of fastening an optical element, here: a reflector 52, on a top side 53 of the fastening element (i.e., here: the ring cover 54) above the LED 106. FIG. 10*b* shows a detail of the ring cover 54 in a top view of its top side 53. The reflector 52 is equipped for this purpose with a rear collar 55 to be fastened on the ring cover 54, which collar has tabs 56 flanged or bent over outward at four points. The number of the tabs 56 can generally comprise at least two, preferably at least three. The reflector 52 is inserted using its collar 55 on the inner wall 8 of the ring cover 54. The tabs 56 can firstly be inserted for this purpose into matching recesses 57 in the top side 53, and the reflector 52 can then be rotated, e.g., similarly or identically to a keyhole or bayonet mount, as indicated by the double arrow in FIG. 10*b*.

Figures 11A, 11B, 12:
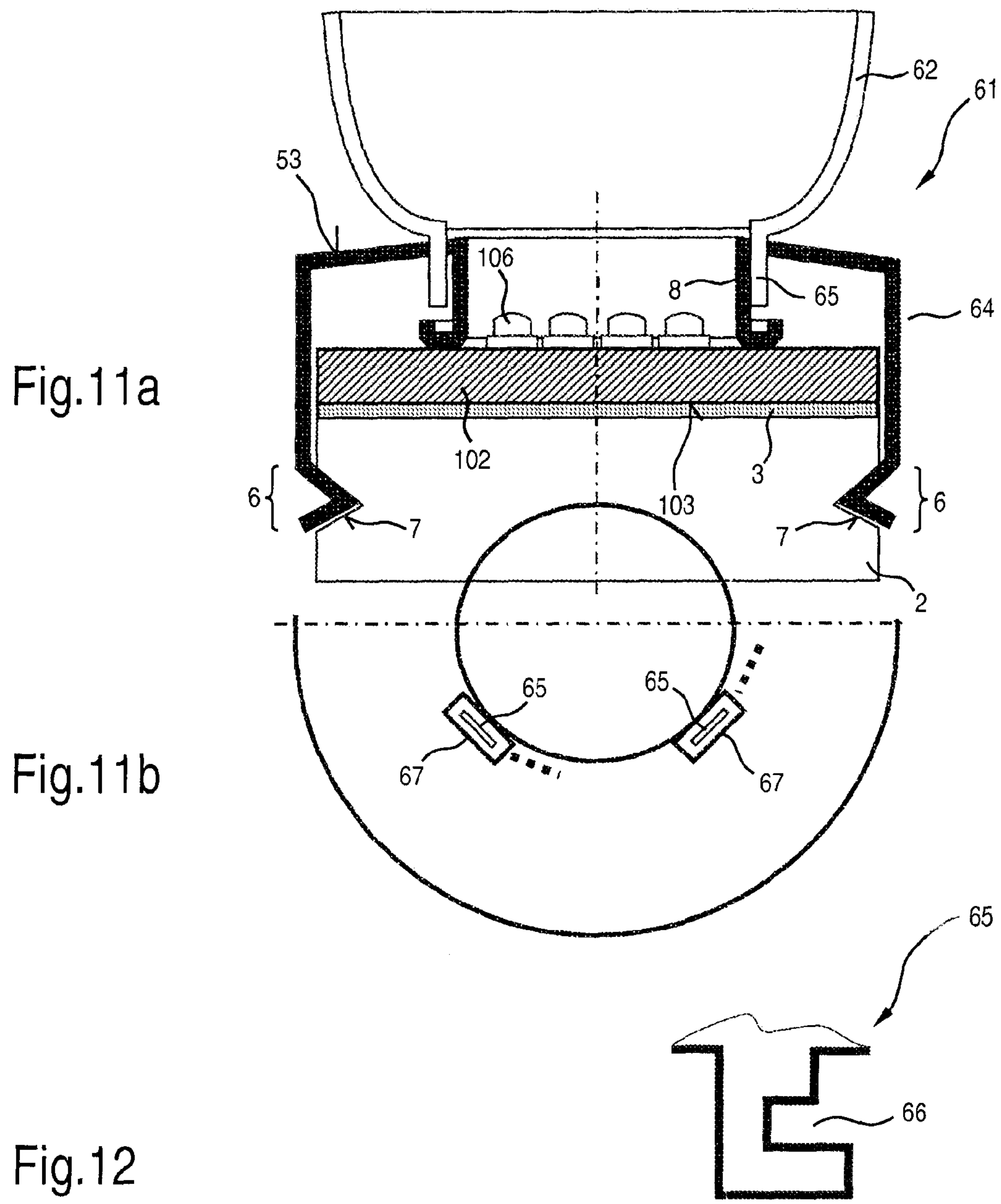
FIG. 11*a* shows a sectional illustration in a side view of an LED module according to still another embodiment.
FIG. 11*b* shows a detail of the LED module from FIG. 11*a* in a top view.
FIG. 12 shows a sectional illustration in a side view of a detail of the LED module from FIG. 11*a* and FIG. 11*b*.

FIG. 11*a* shows a sectional illustration in a side view of an LED module 61 according to still a further embodiment. FIG. 11*b* shows a detail from the LED module 61 in a top view. The LED module 61 is constructed similarly to the LED module 51 and is fastenable on a cooling body 2, however, the rear collar 65 of the reflector 62 is now not flanged or bent over. Rather, the collar 65 has a setback 66 on its outer side, as shown in FIG. 12, which engages in the ring cover 64 when the collar 65 has previously been inserted into a corresponding recess 67 of the ring cover 64, and the reflector 62 has then been rotated similarly to FIG. 10*b*. The collar 65 may in particular not be made peripheral, but rather may have multiple correspondingly shaped tabs or projections.

Of course, the present invention is not restricted to the exemplary embodiments shown.

Thus, features of various embodiments can also be mixed or exchanged. For example, the inner wall 8 of the ring cover 4 can also be inclined, as shown in FIG. 6.

In general, the cooling body can be a dedicated cooling body, which is in turn attachable to a further object, such as a light. Alternatively, the cooling body is, e.g., a part of a light (the LED module is then thus directly installed on a light, which can be used in particular as a heat dissipation element/cooling body).

In general, instead of the ring cover, another cover, in particular a full-surface cover, or another housing, in particular for at least partially covering a light source substrate (printed circuit board, submount, etc.) can also be used.

Figure 1:
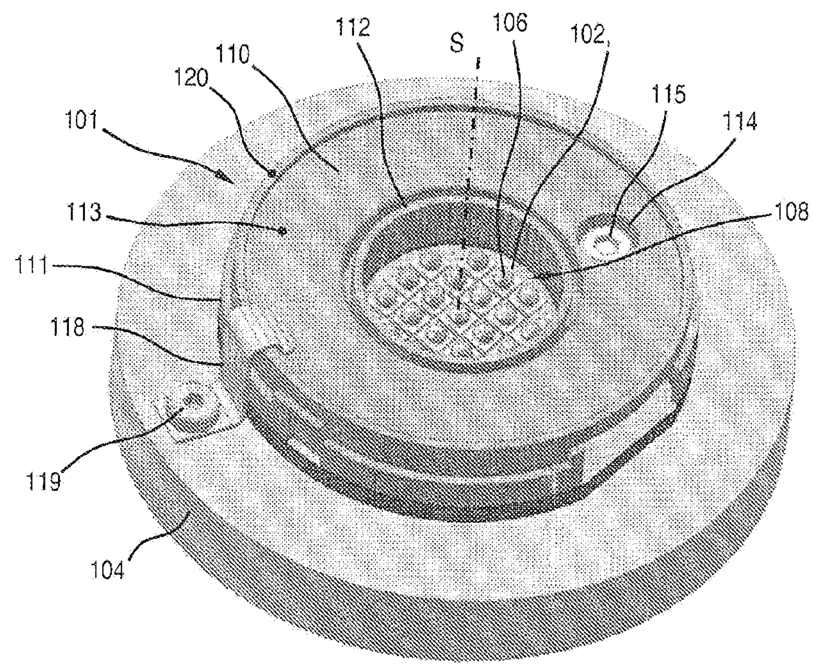
FIG. 1 is a luminous module which has a light source substrate.
Figure 2:
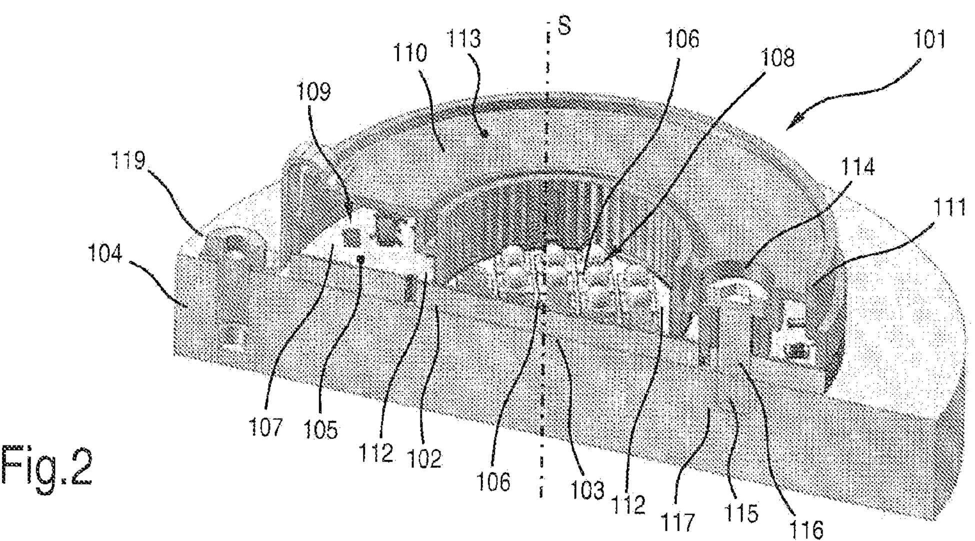
FIG. 2 is a sectional view if a luminous module which has a light source substrate.

Very generally, the cover, in particular the ring cover, also can have no fastening means or fastening elements itself and can be embodied, e.g., as shown in FIG. 1 and FIG. 2. The fastening of the ring cover and the associated LED module can then particularly be achieved by means of at least one independent clamp, which contacts the cover (in particular its top side) on one side and the cooling body (in general: the support) on the other side, e.g., engages therein or encompasses it. For example, the clamp can contact the top side of the ring cover like the fastening element 118 and can be formed like the tabs 13 and engage in a corresponding setback 7 of the support/the cooling body. Multiple such clamps are preferably provided, in particular for an at least approximately symmetrical arrangement.

However, other uses of independent clamps are also possible. Thus, an LED module, for example, which is inserted into a recess of the cooling body (similarly as shown in FIG. 7*c*, for example), may be held by means of multiple (pressure) clamps in the recess. The clamps can have been inserted while compressed laterally between the LED module and the side wall of the recess, for example.

The fastening element is described in such a manner that it is also used as a cover, in particular a ring cover, but the invention is not restricted thereto and can also comprise any other suitable type of a cover.

Furthermore, neither the LED module nor the cooling body is restricted to a rotationally-symmetric basic shape, in particular a circular shape, but rather can assume any suitable basic shape, a free form, a polygonal shape, etc.

The invention claimed is:

1. A fastening element fastening a light source substrate to a first surface of a support, the fastening element comprising:

a first portion seated directly on a first surface of the light source substrate, the first surface of the light source substrate configured to have a light source arranged thereon; and at least one fastening portion fastened to one of:

a notch in an outer peripheral surface of the support, the outer peripheral surface of the support arranged at an angle with respect to the first surface of the support, and an undercut in the first surface of the support, wherein the first portion of the fastening element matingly engages the light source substrate to the first surface of the support.

2. The fastening element of claim 1, wherein the fastening element comprises a cover portion configured to cover at least a part of the light source substrate.

3. The fastening element as claimed in claim 2, wherein the fastening element has the at least one fastening portion in the form of at least one catch element, the at least one catch element respectively having at least one elastically flexible tab equipped with a catch projection.

4. The fastening element as claimed in claim 2, wherein the fastening element has multiple tabs, which extend from the cover portion toward the light source substrate and are arranged substantially symmetrically.

5. The fastening element as claimed in claim 1, wherein at least one optical element is arranged on the fastening element.

6. The fastening element as claimed in claim 1, further comprising:

a light source arranged on a front side of the light source substrate, and wherein the fastening element is seated on the front side of the light source substrate.

7. The fastening element as claimed in claim 6, wherein the fastening element is fixedly connected to the light source substrate.

8. The fastening element as claimed in claim 6, wherein the rear side of the light source substrate also rests on a support and the fastening element is both seated on the front side of the light source substrate and also fastened to the support.

9. The fastening element as claimed in claim 8, wherein the fastening element has the at least one fastening portion in the form of at least one catch element, the at least one catch element respectively having at least one elastically flexible tab equipped with a catch projection, wherein the support has at least one catch counter element for engaging with said at least one catch element of the fastening element.

10. The fastening element as claimed in claim 9, wherein the fastening element has multiple tabs, which extend to the rear of the cover and are arranged substantially symmetrically, wherein the tabs at least partially laterally encompass the support.

11. The fastening element as claimed in claim 8, wherein the fastening element has at least one pivotable lever having an external outer arm, the outer arm being laterally extendable, wherein the support has a recess, into which at least the light source substrate is inserted, the at least one outer arm being extended sufficiently far that it contacts the support in a pressing manner.

12. The fastening element as claimed in claim 11, wherein the recess has at least one undercut in which at least one outer arm engages.

13. The fastening element of claim 1, wherein the fastening element comprises one of a metallic material and a plastic material.

14. The fastening element of claim 13, wherein when the fastening element is the metallic material, the metallic material has a material thickness between 0.2 mm and 2 mm.

15. The fastening element of claim 1, wherein the light source substrate comprises a metal core and at least one region free of a dielectric material at which region the first portion contacts.

16. A fastening element fastening a light source substrate to a first surface of a support, comprising:

a first portion configured to be seated directly on a first surface of the light source substrate, the first surface configured to have a light source arranged thereon; and at least one fastening fastened to one of:

a notch in an outer peripheral surface of the support, the outer peripheral surface of the support arranged at an angle with respect to the first surface of the support, and an undercut in the surface of the support wherein the fastening element mates the light source substrate to the support, wherein the fastening element has at least one pivotable lever having an external outer arm, the outer arm being laterally extendable.

17. The fastening element as claimed in claim 16, wherein a pivot location of the at least one lever is settable with an associated setting element.

18. The fastening element as claimed in claim 17, wherein said associated setting element is a screw.

19. A luminous apparatus having a cover for covering at least a part of a light source substrate, wherein the light source substrate rests on a first surface of a support, and the cover is seated on the light source substrate and is clamped to the support with at least one independent fastening portion, wherein the fastening portion fastens to an undercut in a surface of the support, wherein the fastening portion mates the light source substrate to the support.

* * * * *